United States Patent
Israel et al.

(10) Patent No.: US 7,930,538 B1
(45) Date of Patent: *Apr. 19, 2011

(54) METHOD OF SECURE FILE TRANSFER

(75) Inventors: Jeffrey Israel, Columbia, MD (US); Colin Richmond, Westminster, MD (US); Darrel Sharpe, Millersville, MD (US); Erik Wohlgemuth, Westminster, MD (US)

(73) Assignee: The United States of America as represented by the Director of the National Security Agency, Washington, DC (US)

( * ) Notice: Subject to any disclaimer, the term of this patent is extended or adjusted under 35 U.S.C. 154(b) by 1477 days.

This patent is subject to a terminal disclaimer.

(21) Appl. No.: 11/268,756

(22) Filed: Nov. 2, 2005

(51) Int. Cl.
*H04L 29/06* (2006.01)

(52) U.S. Cl. ........ 713/165; 713/164; 713/150; 709/201; 726/26

(58) Field of Classification Search .................. 713/150, 713/164, 165; 726/26; 709/201
See application file for complete search history.

(56) References Cited

U.S. PATENT DOCUMENTS

| | | | |
|---|---|---|---|
| 5,940,591 A | 8/1999 | Boyle et al. | |
| 6,584,508 B1 | 6/2003 | Epstein et al. | |
| 6,826,694 B1 | 11/2004 | Dutta et al. | |
| 6,978,378 B1 * | 12/2005 | Koretz | 713/193 |

* cited by examiner

*Primary Examiner* — Edan Orgad
*Assistant Examiner* — Roderick Tolentino
(74) *Attorney, Agent, or Firm* — Eric Froehlich; Robert D. Morelli

(57) ABSTRACT

A method of securely transferring files from an un-trusted to a trusted network is disclosed. A file that is an archive file of many component files is separated into constituent files. Each file is stored on a first computer connected to an un-trusted network, and a series of initial checks, such as virus, file size, and file extension are performed. If the files pass, the file is transferred to a second server using a one-way file transfer mechanism. A series of secondary checks, similar to the initial checks is performed on each file transferred. For text files or images, a simplified security rule is applied. An open format transform is performed on proprietary format type files, and embedded file components are separated out. A user-definable security rule set is performed on each open format transform component. If all security tests pass, the file is reassembled and transferred to the trusted network.

25 Claims, 5 Drawing Sheets

METHOD OF SECURE FILE TRANSFER

FIELD OF THE INVENTION

The present invention relates, in general, to multi-computer data transferring and, in particular to computer-to-computer data transfer regulating.

BACKGROUND OF THE INVENTION

With each coming year, office documents are required or expected to contain richer media content and more diverse methods of displaying data. The advantage is that it is substantially easier to produce professional-looking documents from the desktop.

These richly formatted, unstructured data files make it substantially easier to pass malicious code as well. Interpreters such as Microsoft Word or Ghostview open these files and may inadvertently execute malicious scripts, macros, etc. contained within the seemingly innocuous office file.

Deterring the malicious content is a challenge. The simplest solution for eliminating the risk of passing this kind of content is to simply prohibit the transfer of files that can contain malicious code. This leaves simple ASCII text files and images, among others, that can be transferred, making these content-oriented files less useful.

The key to safely emailing office documents is recognizing and prohibiting any code that could cause an interpreting application to do anything other than render the intended document. However, the list of known problems, vulnerabilities, and exploits is continually evolving. Since email exploit shields usually operate by specifying what a "bad" file or "bad" content, is, they cannot combat vulnerabilities newer than the last definition of "bad" files. This is an inherent design flaw of all signature-based solutions.

U.S. Pat. No. 5,940,591, entitled "APPARATUS AND METHOD FOR PROVIDING NETWORK SECURITY," discloses a method of performing security functions on a non-secure network. The method uses a multi-level secure network architecture to support services to many domains from one, offering communications services (video, audio, others) over a trusted security protocol, which exists at the security perimeter created by the secure network interface units. The guard is a session manager to an external set of networks. This method requires the selection of portions that do not require the same level of trust. Although the system checks access control, individual files are not verified for malicious code. The present invention is not limited in this regard. U.S. Pat. No. 5,940,591 is hereby incorporated by reference into the specification of the present invention.

U.S. Pat. No. 6,584,508, entitled "ADVANCED DATA GUARD HAVING INDEPENDENTLY WRAPPED COMPONENTS," discloses a method of increasing the security of a data guard. The data guard is configurable, for items such as HTTP traffic, SMTP traffic, etc. A set of proxy servers sits between an "internal" network and an "external" network and examines traffic. The first proxy server communicates with the internal computer network, and the second proxy server communicates with the external network. Protocol specific operations are converted to protocol independent data. Administrators define security policies that affect the information going between the proxy servers, deciding which information to pass. The system uses two-way communications that provide an adversary with information regarding the security protocols used. The present invention is not limited in this regard. U.S. Pat. No. 6,584,508 is hereby incorporated by reference into the specification of the present invention.

U.S. Pat. No. 6,826,694, entitled "HIGH RESOLUTION ACCESS CONTROL," discloses a method for performing security functions at a firewall. After a packet is received at a firewall, the header is checked. A rule specific to the header information is applied to analyze the content of the packet at the firewall. Changing the packet header to a benign file type is relatively simple. Malicious code may then pass through the firewall. The present invention is not limited in this regard. U.S. Pat. No. 6,826,694 is hereby incorporated by reference into the specification of the present invention.

SUMMARY OF THE INVENTION

It is an object of the present invention to provide a method of one-way file transfer to a variety of file formats. The present invention also provides a cleaning operation of files being transferred to mitigate the threat of malicious code from entering an internal network.

The first step of the present invention is saving at least one user-selected file to a first server connected to a first network, the first network being an un-trusted network. The first server is the entry point for transferring files from an un-trusted network to a trusted network.

In the second step, if the user-selected file is a collection of files stored as an archive file, then separate each of the archived component files into separate files.

The third step is performing at least one initial security test on the at least one user-selected file. The initial security test includes one or more user-definable security rules, such as a virus scan, a file size check, a file extension type check, a comparison test between the file type and the file extension, and/or any equivalent set of security tests.

In the fourth step, if the initial security test fails, perform a user-definable initial security function on the user-selected file. The user-definable initial security function may include stopping further processing of the file, sending an alert message, or other like functions.

The fifth step of the present method is transferring each user-selected file from the first server connected to the first network to a second server connected to a second, and more trusted network, using a one-way transfer mechanism. The second server is topologically adjacent to the second network.

The sixth step is saving each file to a second server. Because the second server is connected to the second network, it has a higher level of trust compared to the first server.

The seventh step is performing at least one secondary security test on each user-selected file.

In the eighth step, if the second security test fails, then perform a user-definable secondary security function on each user-selected file that failed.

In the ninth step, if the user-selected file comprises a graphic image, then perform at least one user-definable image security check on said the user-selected file. The at least one user-definable image security check comprises at least one security rule.

In the tenth step, if any of the security rules in the at user-definable image security check is violated, delete the user-selected file from the second server.

In the eleventh step, if the user-selected file comprises text, perform at least one user-definable text security check on the file.

In the twelfth step, if one of the at least one security rule in the user-definable text security check is violated; delete the file from the second server.

In the thirteenth step, if the user-selected file comprises an unsupported proprietary file type, delete the user-selected file.

In the fourteenth step, if the user-selected file comprises a supported proprietary file type, performing open format transform on the user-selected file. The open format transform returns at least one open format transform sub-files, depending on the file type. In the preferred embodiment, an allowed proprietary file type is an OLE2 file type, and is of one of a spreadsheet document, a text processor document, and a presentation document. In the preferred embodiment, the open format transform is an XML transform.

The fifteenth step of the present method is scanning the open format transform sub-files for embedded file elements.

In the sixteenth step, if embedded file elements are found in the open format transform sub-files, and then separate the embedded file elements into constituent parts. Repeat steps 9 through step 15 for each constituent parts of the open format transform sub-files.

The seventeenth step is performing at least one user-definable open format security check on the open format transform sub-file. The at least one user-definable open format security check comprises at least one security rule.

In the eighteenth step, if any of the security rules in the user-definable open format transform security check is violated, save the file as a .PDF format file and delete the file from the second server.

The nineteenth step of the present method is repeating steps 9 through step 19 for each open format transform sub-file.

In the twentieth step, if no security rules were violated, then reassemble the constituent parts of the user-selected file into at least one trusted file. Save the file and send to a second, or trusted network. The reassembled file is saved in the original proprietary format of the original file.

The twenty-first step of the present method is deleting the original user-selected file and any constituent parts.

The twenty-second, and last, step is sending any PDF files that were created to the second, or trusted network.

DETAILED DESCRIPTION

The present invention is a novel method of providing one-way file transfer to a variety of file formats.

The present invention also provides a cleaning operation; files being transferred are scanned to mitigate the threat of malicious code from entering a trusted network.

Software developers generally develop a product to fill a specific business need, such as inventory tracking or desktop publishing. In most of these cases, users need to move files or data from one network to another. Often, a higher, or more secure network is the system with all of the businesses records. Unscrupulous persons may try to harm the business by introducing malicious code into the business records.

As described above, the prior art methods do not protect the trusted network by providing secure transfer of files from the un-trusted network. Embedded malicious code can also hide in files that appear safe, based on their file extension.

Figure 1:
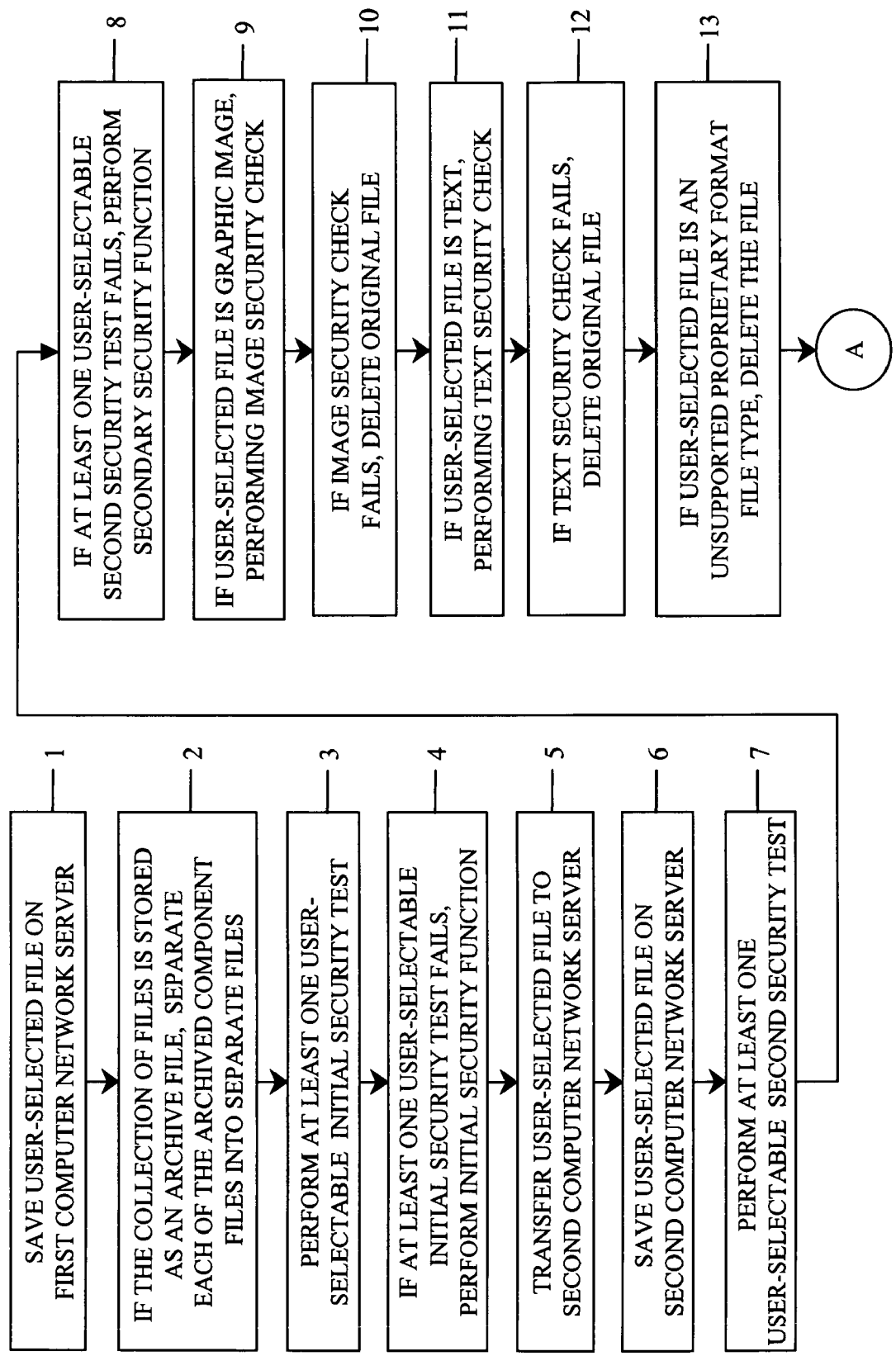
FIG. 1 is a flowchart of steps of the present invention.
Figure 1:
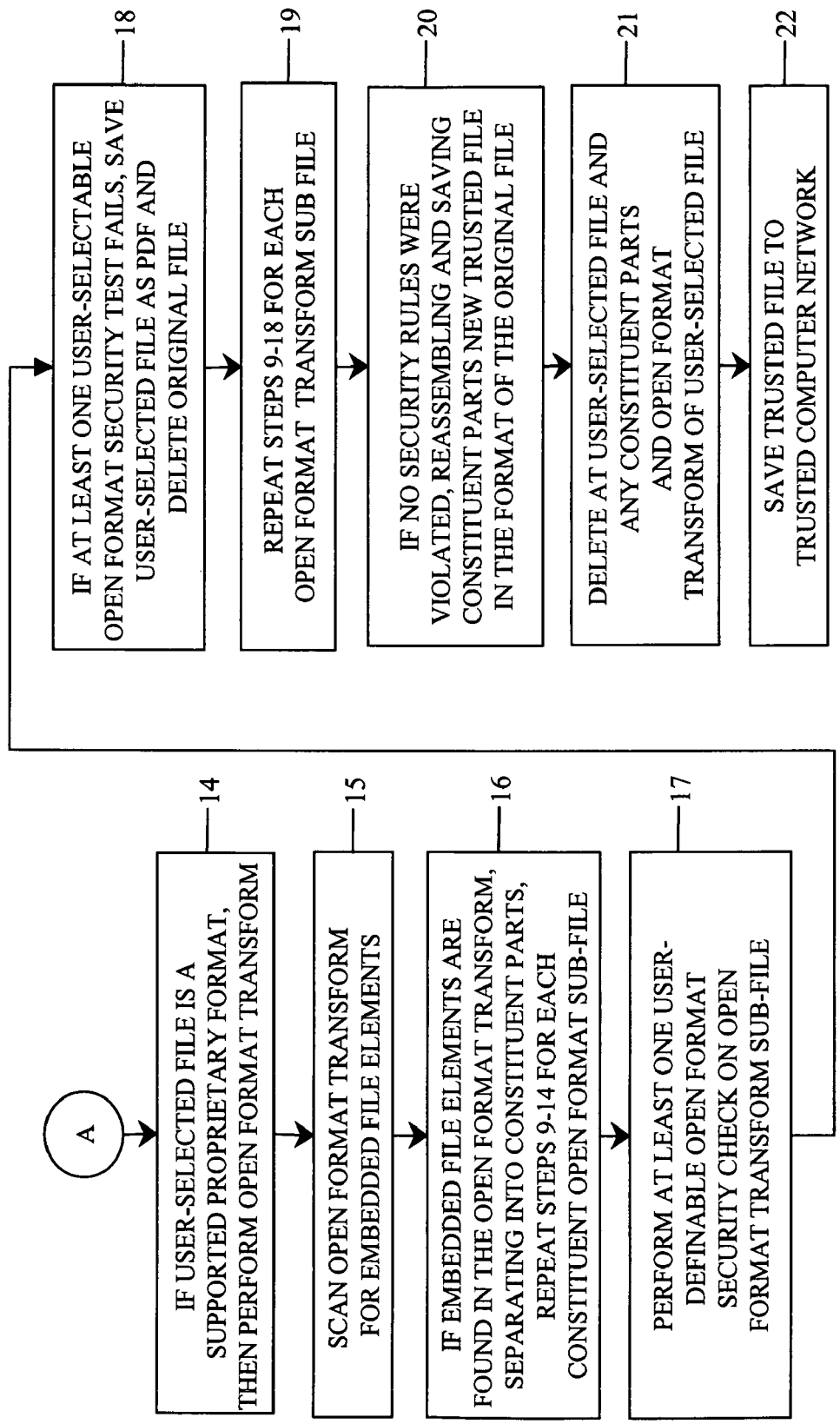

FIG. 1 is a flowchart of the steps of the present invention.

The first step 1 of the present method is saving at least one user-selected file on first server connected to a first network. The first network is an un-trusted network. The user may save one file or multiple files to the first server. The file saved may contain embedded pictures, macros, clipart, graphics, etc. The file may also be an archive file, such as a .zip file.

In the second step 2 of the present method, if the at least one user-selected file is a collection of files stored as an archive file, separating each of the archived component files into separate at least one user-selected files.

In practice, a user may store archive files in a .zip format, or may zip files together to compress the files before sending them to a recipient. The third step 3 of the present method is performing an initial security test on the at least one user-selected file. Persons skilled in the art will recognize the at least one user-selected file includes all component files separated in step 2.

The initial security test is configurable by an administrator, configuration specialist, or other administrative personnel, and may include a virus scan, a file size check, a file extension check, a comparison test between the file type and the file extension, any equivalent security test, and any combination thereof. Preferably, each of the previously mentioned security tests is performed in a forced sequence. In the preferred embodiment, if one of the initiated initial security tests does not function, all further processing steps stop until administrative personnel intervene.

In the fourth step 4 of the present method, if the initial security test fails, a user-definable initial security function is performed on the at least one user-selected file.

The user-definable initial security function comprises a user-definable set of security rules. The user-definable set of security rules are selected from the set of security rules consisting of sending an alert to the un-trusted network, sending an alert to the trusted network, stopping further processing, creating a PDF format file of said at least one user-selected file, logging an error event on the first network server, deleting the at least one user-selected file, any equivalent set of security rules, and any combination thereof.

Persons skilled in the art will recognize that sending a message to the un-trusted network server can create a security risk, alerting a person to the fact that the file transfer did not occur and possibly the reason why it did not occur, giving a malicious user additional feedback towards compromising the system.

In practice, an alert is not sent to the un-trusted server, and a user-selected file that fails the initial security test is deleted.

The fifth step 5 in the present method is transferring the at least one user-selected file from the first server to a second located on a second network using a one-way transfer mechanism. The second server is topologically adjacent to the second network.

The sixth step 6 in the present method is saving the at least one user-selected file on the second server. Because the second server is connected to the second network, it has a higher level of trust compared to the first server.

The first server connected to the first network is considered of lesser trust for purposes of the present invention. The first server performs initial tests, while the second server performs tests that are more extensive or more robust.

In the seventh step 7 of the present method is performing a second security test on the at least one user-selected file.

The second security test is configurable, and may include a virus scan, a file size check, a file extension check, a comparison test between the file type and the file extension, any equivalent security test, and any combination thereof. Preferably, each of the previously mentioned security tests is performed.

In the eighth step 8 of the present method, if the second security test fails, a user-definable secondary security function is performed on the at least one user-selected file.

The user-definable initial security function comprises a user-definable set of security rules. The user-definable set of security rules are selected from the set of security rules consisting of sending an alert to the un-trusted network, sending an alert to the trusted network, stopping further processing, creating a .PDF format file of said at least one user-selected file, logging an error event on the second server, deleting the at least one user-selected file, any equivalent set of security rules, and any combination thereof.

In practice, a different virus scan program is used in step 8 than was used in step 4. At this stage of the present method, preliminary tests have been completed, and each user-selected file meets the system's requirements for allowable file types and file size.

In the ninth step 9, if the at least one user-selected file comprises a graphic image, perform at least one user-definable image security check on the user-selected file. The user-definable image security check comprises at least one security rule.

In the tenth step 10, if any of said at least one security rule in the at least one user-definable image security check is violated, deleting said at least one user-selected file of said graphic image from said second network server.

In the eleventh step 11, if the at least one user-selected file comprises text, performing at least one user-definable text security check on the user-selected file. The user-definable text security check comprises at least one security rule.

In the twelfth step 12, if any of the at least one security rule in the at least one user-definable text security check is violated, deleting the file from the second network server.

In the thirteenth step 13, if the at least one user-selected file comprises an unsupported proprietary file type, delete the user-selected file.

In the fourteenth step 14, if the at least one user-selected file comprises a supported proprietary file type performing an open format transform on the user-selected file. The open format transform returns at least one open format transform sub-file, depending upon the file type.

In the preferred embodiment, a supported proprietary file type is a OLE2 file type of one of a spreadsheet document, a text processor document, and a presentation document. However, those persons skilled in the art will recognize that other proprietary file types may be supported.

A word processor file has the file extension .doc if it is a Microsoft Word file. Other word processors, such as WordPerfect, etc. will have an analogous file extension.

A presentation file has the file extension of .ppt or .pps, if it is a Microsoft PowerPoint file. Other presentation files will have an analogous file extension.

A spreadsheet has the file extension .xl, .xls, .xla, .xlt, .xlm, .xlc, if it is a Microsoft Excel file. Other spreadsheet files will have an analogous file extension.

By way of example, if the user-selected file is from the Microsoft Office suite (Word, Excel, PowerPoint), convert the user-selected file to an XML-delimited format; preferably, using a commercial product such as OpenOffice.org or Sun's StarOffice is used.

The fifteenth step 15 of the present method is scanning the at least one open format transform sub-files for embedded file elements.

In the sixteenth step 16, if embedded file elements are found in the at least one open format transform sub-files, the embedded file elements are separated into constituent parts. Steps nine 9 through step fourteen 14 are repeated for each constituent parts of the open format transform sub-files.

The seventeenth step 17 of the present method is performing at least one user-definable open format security check on the at least one open format transform sub-file. The at least one user-definable open format security check comprises at least one security rule.

In the eighteenth step 18, if any of the at least one security rule in the at least one user-definable open format security check is violated, saving the at least one user-defined file as a .PDF format file and deleting the at least one user-selected file from the second server.

Preferably, unknown and disallowed object types are tagged as "bad" and not passed. Allowed object types that conform to the security rules for the particular object type, are passed.

The nineteenth step 19 in the present method is repeating steps nine 9 through step eighteen 18 for each open format transform sub-file.

In the twentieth step 20, if no security rules were violated, the constituent parts of the user-selected file are reassembled and saved as a trusted file and sent to the trusted network in the original format. If no constituent parts of the at least one user-selected file existed, the user-selected file is saved as one trusted file and sent to a trusted network. The trusted file is saved in the proprietary format of the original file.

The twenty-first step 21 of the present method is deleting the at least one user-selected file and any constituent parts of the at least one user-selected file. At this stage in the present method, temporary files that were created for processing are deleted to save space on the second network server.

In the twenty-second, and final, step 22 of the present method, any created PDF files are sent to the trusted network. The recipient may access the files, save the files to a local machine, or further edit the files.

Figure 2:
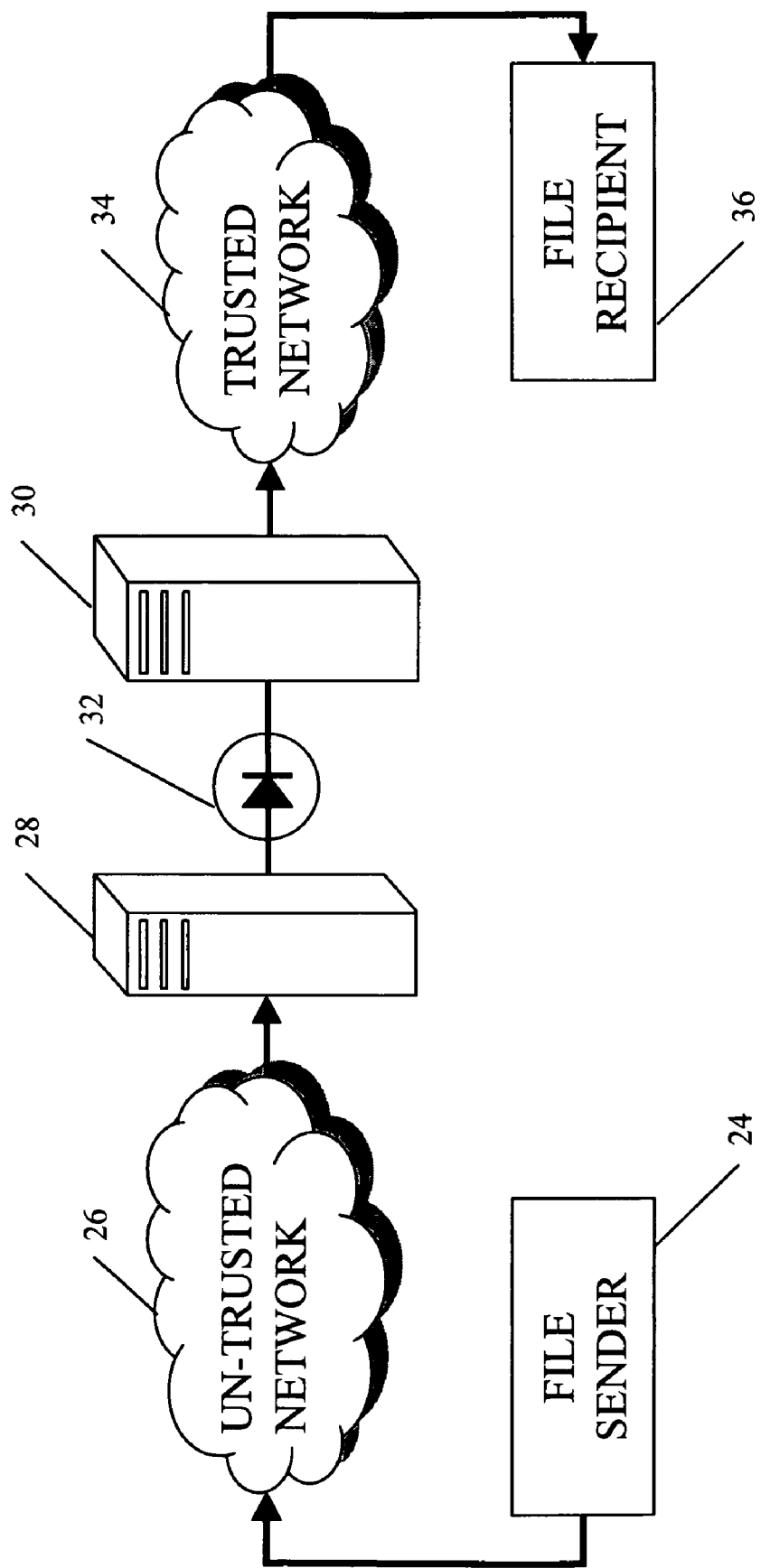
FIG. 2 is a conceptual view of the present invention.

FIG. 2 shows a general overview of the present invention. The file sender 24 has at least one file on the un-trusted network 26 and saves a user-selected file on a first network server 28. The first network server 28 is considered un-trusted. A series of security checks are performed on the user-selected file, and if all of the checks pass, the user-selected file is transferred to the second server 30 through a one-way file transfer mechanism 32. A series of security checks are performed on the user-selected file, and if all of the checks pass, the user-selected file is transferred to the trusted network 34. Once the user-selected file is saved on the trusted network 34, the file recipient 36 may access the file.

Figure 3:
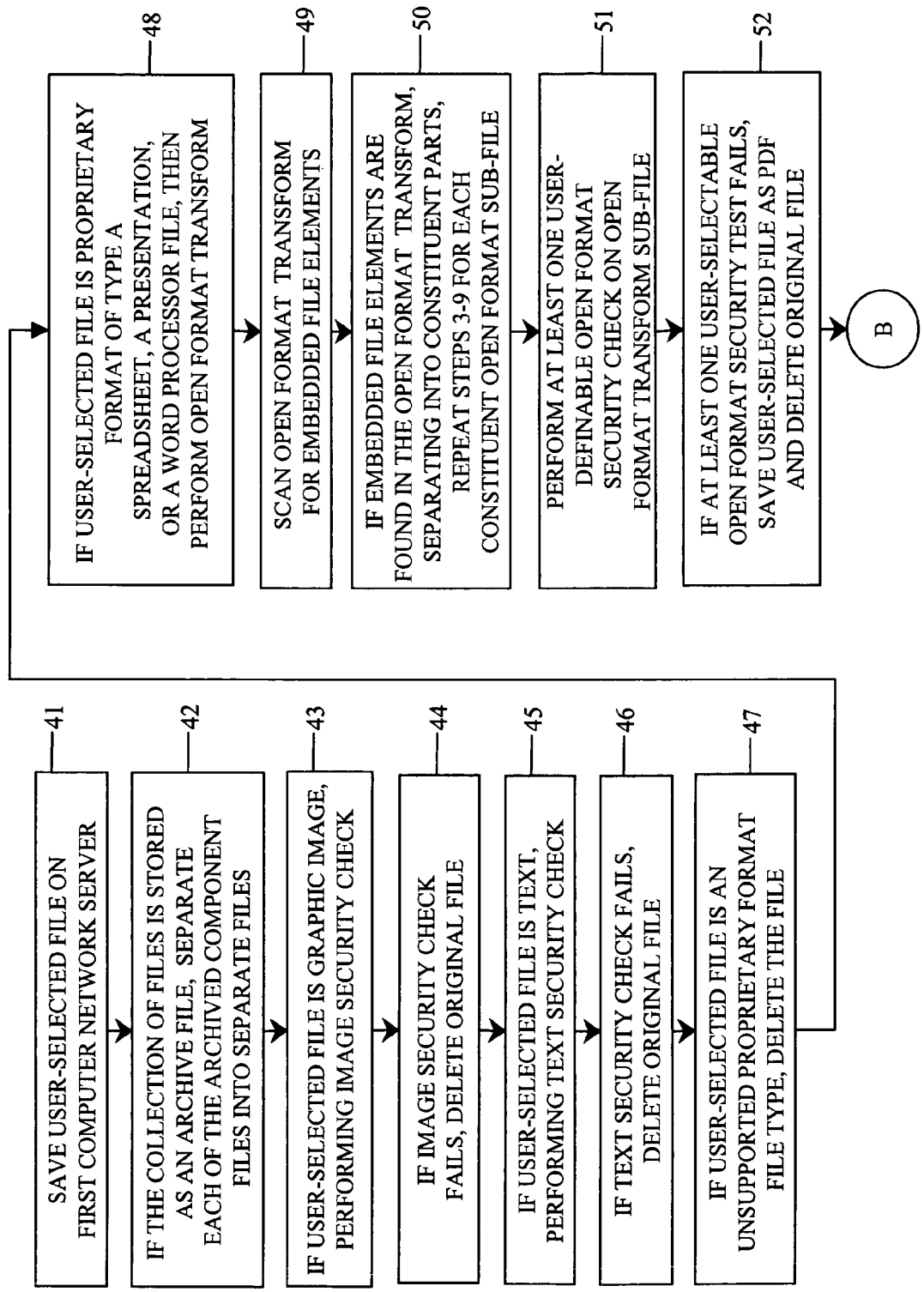
FIG. 3 is a flowchart of steps of another embodiment of the present invention.
Figure 3:
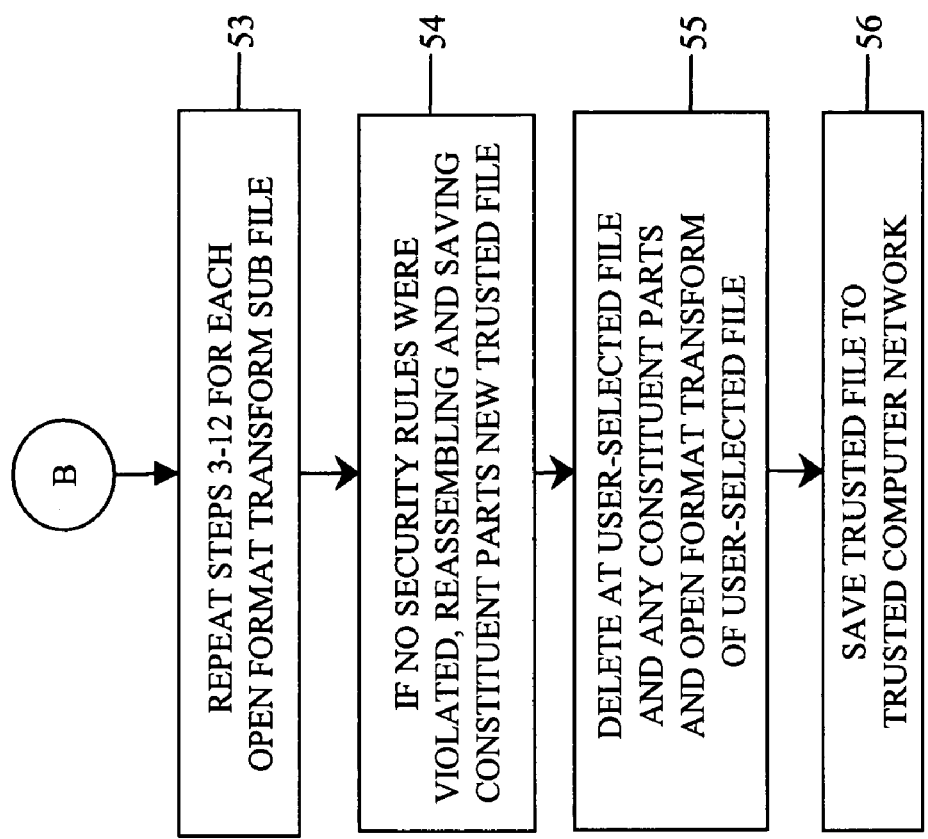

An alternate embodiment is shown in FIG. 3.

The first step 41 is saving at least one user-selected file on a first server. As in the preferred embodiment described above, the first server is connected to a first, un-trusted, network.

In the second step 42 of the present method, if the at least one user-selected file is a collection of files stored as an archive file, separating each of the archived component files into separate at least one user-selected files.

In the third step 43, if the at least one user-selected file comprises a graphic image, perform at least one user-definable image security check on the user-selected file. The user-definable image security check comprises at least one security rule.

In the fourth step 44, if any of said at least one security rule in the at least one user-definable image security check is violated, deleting the at least one user-selected file of said graphic image from said second server.

In the fifth step 45, if the at least one user-selected file comprises text, performing at least one user-definable text security check on the user-selected file. The user-definable text security check comprises at least one security rule.

In the sixth step 46, if any of the at least one security rule in the at least one user-definable text security check is violated, deleting the file from the second server.

In the seventh step 47, if the at least one user-selected file comprises an unsupported proprietary format file type, deleting the user-selected file.

In the eighth step 48, if the at least one user-selected file comprises a supported proprietary format file type performing an open format transform on the user-selected file. The open format transform returns at least one open format transform sub-file, depending upon the file type.

In the preferred embodiment, a supported proprietary format is a OLE2 file type of one of a spreadsheet document, a text processor document, and a presentation document. However, those persons skilled in the art will recognize that other open format file types may be supported.

As described above, a word processor has the file extension .doc if it is a Microsoft Word file, a presentation file has the file extension of .ppt or .pps, if it is a Microsoft PowerPoint file, and a spreadsheet has the file extension .xl, .xls, .xla, .xlt, .xlm, .xlc, if it is a Microsoft Excel file.

The ninth step 49 is scanning the at least one open format transform sub-files for embedded file elements.

In the tenth step 50, if embedded file elements are found in the at least one open format transform sub-files, the embedded file elements are separated into constituent parts. Steps three 48 through step eight 48 are repeated for each constituent parts of the open format transform sub-files.

The eleventh step 51 is performing at least one user-definable open format security check on the at least one open format transform sub-file. The at least one user-definable open format security check comprises at least one security rule.

In the twelfth step 52, if any of the at least one security rule in the at least one user-definable open format security check is violated, saving the at least one user-defined file as a PDF format file and deleting the at least one user-selected file from the second server.

In practice, if saving the user-defined file as a PDF format file fails, the original user-defined file is deleted and no further processing occurs.

The thirteenth step 53 is repeating steps three 43 through step twelve 52 for each open format transform sub-file.

In the fourteenth step 54, if no security rules were violated, the constituent parts of the user-selected file are reassembled as a file in the same format as the original file, saved as a trusted file, and sent to the trusted network. If no constituent parts of the at least one user-selected file existed, the user-selected file is saved as one trusted file and sent to a trusted network. The reassembled trusted file is saved in the same proprietary format of the original file.

The fifteenth step 55 is deleting the at least one user-selected file and any constituent parts of the at least one user-selected file. At this stage in the present method, temporary files that were created for processing are deleted to save space on the second network server.

In the sixteenth, and final, step 56 of the present method, any created PDF files are sent to the trusted network. The recipient may access the files, save the files to a local machine, or further edit the files.

While the preferred embodiments of the invention have been illustrated and described, it will be apparent to those of ordinary skill in the art that various changes and modifications may be made without deviating from the inventive concepts set forth above.

What is claimed is:

1. A method of transferring files from an un-trusted computer network to a trusted computer network, comprising the steps of:
   a) saving at least one user-selected file on a first server connected to a first network, said first network is an un-trusted network;
   b) if the at least one user-selected file is a collection of files stored as an archive file, separating each of the archived component files into separate at least one user-selected files;
   c) performing at least one initial security test on said at least one user-selected file;
   d) if said at least one initial security test fails, performing a user-definable initial security function on said at least one user-selected file;
   e) transferring said at least one user-selected file from said first server to a second server using a one-way transfer mechanism;
   f) saving said at least one user-selected file on a second server;
   g) performing at least one second security test on said at least one user-selected file;
   h) if said at least one second security test fails, performing a user-definable secondary security function on said at least one user-selected file;
   i) if said at least one user-selected file comprises a graphic image, performing at least one user-definable image security check on said at least one user-selected file, said at least one user-definable image security check comprising at least one security rule;
   j) if any of said at least one security rule in the at least one user-definable image security check is violated, deleting said at least one user-selected file of said graphic image from said second server;
   k) if said at least one user-selected file comprises text, performing at least one user-definable text security check on said at least one user-selected file, said at least one user-definable text security check comprising at least one security rule;
   l) if any of said at least one security rule in the at least one user-definable text security check is violated, deleting said at least one user-selected file of said text from said second server;
   m) if said at least one user-selected file comprises an unsupported proprietary format file type deleting said at least one user-selected file;
   n) if said at least one user-selected file comprises a supported proprietary format file type, performing an open format transform on said at least one user-selected file, said open format transform returning at least one open format transform sub-files;
   o) scanning said at least one open format transform sub-file for embedded file elements;
   p) if embedded file elements are found in said at least one open format transforms sub-files, separating said embedded file elements into constituent parts of said at least one open format transform sub-files and repeating steps (i) through (n) for each constituent parts of said at least one open format transform sub-files;
   q) performing at least one user-definable open format security check on said at least one open format transform sub-file, said at least one user-definable open format security check comprising at least one security rule;

r) if any of said at least one security rule in the at least one user-definable open format security check is violated, saving said at least one user-defined file as a .PDF format file and deleting said at least one user-selected file from said second server;

s) repeating steps (i) through (r) for each open format transform sub-file;

t) if no security rules were violated, reassembling and saving said constituent parts of said at least one user-selected file into at least one trusted file, in the format of the original user-selected file, and if no constituent parts of said at least one user-selected file existed, saving said at least one user-selected file into at least one trusted file, said at least one trusted file sent to a trusted network;

u) deleting said at least one user-selected file and any constituent parts of said at least one user-selected file; and v) sending any created PDF files to a trusted network.

2. The method of claim 1, wherein said at least one user-definable initial security test is selected from the group of security tests consisting of a virus scan, a file size check, a file extension type check, a comparison test between the file type and the file extension, any equivalent set of security test, and any combination thereof.

3. The method of claim 2, wherein said user-definable initial security function comprises a user-definable set of security rules, said user-definable set of security rules selected from the set of security rules consisting of sending an alert message to said un-trusted network, sending an alert message to said trusted network, stopping further processing, creating a .PDF format file of said at least one user-selected file, logging an error event on said first network server, deleting the at least one user-selected file, any equivalent set of security rules, and any combination thereof.

4. The method of claim 3, wherein said at least one user-definable second security test is selected from the group of security tests consisting of a virus scan, a file size check, a file extension type check, a comparison test between the file type and the file extension, any equivalent set of security test, and any combination thereof.

5. The method of claim 4, wherein said user-definable secondary security function comprises a user-definable set of security rules, said user-definable set of security rules selected from the set of security rules consisting of sending an alert message to said trusted network, stopping further processing, creating a .PDF format file of said at least one user-selected file, logging an error event on said second server, deleting the at least one user-selected file, any equivalent set of security rules, and any combination thereof.

6. The method of claim 5, wherein said proprietary format file type is a OLE2 file type of one of a spreadsheet document, a text processor document, and a presentation document comprise a file extension, said file extension selected from the group of file extensions consisting of a .xl, a .xls, a .xla, a .xlt, a .xlm, a .xlc, a .doc, a .ppt, a .pps, any equivalent file extension, and any combination thereof.

7. The method of claim 6, wherein said step of performing a user-definable open format security check on said at least one open format transform sub-file comprises the step of saving said at least one user-defined file as a .PDF format file and deleting said at least one open format transform sub-files and the corresponding at least one user-selected file from said second server.

8. The method of claim 7, wherein said initial virus scan and said secondary virus scan comprise different virus scanning software.

9. The method of claim 1, wherein said user-definable initial security function comprises a user-definable set of security rules, said user-definable set of security rules selected from the set of security rules consisting of sending an alert message to said un-trusted network, sending an alert message to said trusted network, stopping further processing, creating a .PDF format file of said at least one user-selected file, logging an error event on said first server, deleting the at least one user-selected file, any equivalent set of security rules, and any combination thereof.

10. The method of claim 1, wherein said at least one user-definable second security test is selected from the group of security tests consisting of a virus scan, a file size check, a file extension type check, a comparison test between the file type and the file extension, any equivalent set of security test, and any combination thereof.

11. The method of claim 1, wherein said user-definable secondary security function comprises a user-definable set of security rules, said user-definable set of security rules selected from the set of security rules consisting of sending an alert message to said trusted network, stopping further processing, creating a .PDF format file of said at least one user-selected file, logging an error event on said second server, deleting the at least one user-selected file, any equivalent set of security rules, and any combination thereof.

12. The method of claim 1, wherein said proprietary format file type is a OLE2 file type of one of a spreadsheet document, a text processor document, and a presentation document comprise a file extension, said file extension selected from the group of file extensions consisting of a .xl, a .xls, a .xla, a .xlt, a .xlm, a .xlc, a .doc, a .ppt, a .pps, any equivalent file extension, and any combination thereof.

13. The method of claim 1, wherein said step of performing a user-definable open format security check on said at least one open format transform sub-file comprises the step of saving said at least one user-defined file as a .PDF format file and deleting said at least one open format transform sub-files and the corresponding at least one user-selected file from said second server.

14. The method of claim 1, wherein said initial virus scan and said secondary virus scan comprise different virus scanning software.

15. The method of claim 1, wherein said open format transform is a XML transform.

16. A method of performing a security check on user files, comprising the steps of:

a) saving at least one user-selected file on a first server;

b) if the at least one user-selected file is a collection of files stored as an archive file, separating each of the archived component files into separate at least one user-selected files;

c) if said at least one user-selected file comprises a graphic image, performing at least one user-definable image security check on said at least one user-selected file, said at least one user-definable image security check comprising at least one security rule;

d) if any of said at least one security rule in the at least one user-definable image security check is violated, deleting said at least one user-selected file of said graphic image from said second server;

e) if said at least one user-selected file comprises text, performing at least one user-definable text security check on said at least one user-selected file, said at least one user-definable text security check comprising at least one security rule;

f) if any of said at least one security rule in the at least one user-definable text security check is violated, deleting said at least one user-selected file of said text from said second server;

g) if said at least one user-selected file comprises an unsupported proprietary format file type deleting said at least one user-selected file;

h) if said at least one user-selected file comprises a supported proprietary format file type, performing an open format transform on said at least one user-selected file, said open format transform returning at least one open format transform sub-files;

i) scanning said at least one open format transform sub-file for embedded file elements; if embedded file elements are found in said at least one open format transform sub-files, separating said embedded file elements into constituent parts of said at least one open format transform sub-files and repeating steps (c) through (h) for each constituent parts of said at least one open format transform sub-files;

j) performing at least one user-definable open format security check on said at least one open format transform sub-file, said at least one user-definable open format security check comprising at least one security rule;

k) if any of said at least one security rule in the at least one user-definable open format security check is violated, saving said at least one user-defined file as a .PDF format file and deleting said at least one user-selected file from said second network server;

l) repeating steps (c) through (k) for each open format transform sub-file;

m) if no security rules were violated, reassembling and saving said constituent parts of said at least one user-selected file into at least one trusted file, in the format of the original user-selected file, and if no constituent parts of said at least one user-selected file existed, saving said at least one user-selected file into at least one trusted file, said at least one trusted file sent to a trusted network;

i) deleting said at least one user-selected file and any constituent parts of said at least one user-selected file; and n) sending any created PDF files to a trusted network.

17. The method of claim 16, further comprising:
a) performing at least one security test on said at least one user-selected file; and
b) if said at least one security test fails, performing a user-definable security function on said at least one user-selected file.

18. The method of claim 17, wherein said at least one user-definable security test is selected from the group of security tests consisting of a virus scan, a file size check, a file extension type check, a comparison test between the file type and the file extension, any equivalent set of security test, and any combination thereof.

19. The method of claim 18, wherein said user-definable security function comprises a user-definable set of security rules, said user-definable set of security rules selected from the set of security rules consisting of sending an alert message to a network, stopping further processing, creating a .PDF format file of said at least one user-selected file, logging an error event on a network server, deleting the at least one user-selected file, any equivalent set of security rules, and any combination thereof.

20. The method of claim 19, wherein said proprietary format file type is an OLE2 file type of one of a spreadsheet document, a text processor document, and a presentation document comprise a file extension, said file extension selected from the group of file extensions consisting of a .xl, a .xls, a .xla, a .xlt, a .xlm, a .xlc, a .doc, a .ppt, a .pps, any equivalent file extension, and any combination thereof.

21. The method of claim 20, wherein said step of performing a user-definable open format security check on said at least one open format transform sub-file comprises the step of saving said at least one user-defined file as a .PDF format file and deleting said at least one open format transform sub-files and the corresponding at least one user-selected file from said second network server.

22. The method of claim 16, wherein said user-definable security function comprises a user-definable set of security rules, said user-definable set of security rules selected from the set of security rules consisting of sending an alert message to a network, stopping further processing, creating a .PDF format file of said at least one user-selected file, logging an error event on a server, deleting the at least one user-selected file, any equivalent set of security rules, and any combination thereof.

23. The method of claim 16, wherein said proprietary format file type is an OLE2 file type of one of a spreadsheet document, a text processor document, and a presentation document comprise a file extension, said file extension selected from the group of file extensions consisting of a .xl, a .xls, a .xla, a .xlt, a .xlm, a .xlc, a .doc, a .ppt, a .pps, any equivalent file extension, and any combination thereof.

24. The method of claim 16, wherein said step of performing a user-definable open format security check on said at least one open format transform sub-file comprises the step of saving said at least one user-defined file as a .PDF format file and deleting said at least one open format transform sub-files and the corresponding at least one user-selected file from said second server.

25. The method of claim 16, wherein said open format transform is a XML transform.

\* \* \* \* \*